(12) United States Patent
Zimmermann

(10) Patent No.: US 9,801,354 B2
(45) Date of Patent: Oct. 31, 2017

(54) TREAT DISPENSER AS REWARD AND TRAINING AID

(71) Applicant: Anna Zimmermann, Lahr (DE)

(72) Inventor: Anna Zimmermann, Lahr (DE)

( * ) Notice: Subject to any disclaimer, the term of this patent is extended or adjusted under 35 U.S.C. 154(b) by 9 days.

(21) Appl. No.: 14/837,807

(22) Filed: Aug. 27, 2015

(65) Prior Publication Data

US 2016/0066537 A1 Mar. 10, 2016

(30) Foreign Application Priority Data

Sep. 4, 2014 (DE) ........................ 10 2014 013 162

(51) Int. Cl.
*A01K 15/02* (2006.01)
*A01K 5/00* (2006.01)
*A01K 5/01* (2006.01)

(52) U.S. Cl.
CPC .............. *A01K 5/00* (2013.01); *A01K 5/0114* (2013.01); *A01K 15/02* (2013.01); *A01K 15/026* (2013.01)

(58) Field of Classification Search
CPC ........ A01K 5/00; A01K 15/02; A01K 15/025; A01K 5/0114; A01K 15/026; B65D 83/0409; B65D 83/04; B65D 2583/0481; B65D 85/60; B65D 83/0481
USPC ............. 119/709, 51.01, 710, 711, 712, 702; 221/277, 259; 446/475
See application file for complete search history.

(56) References Cited

U.S. PATENT DOCUMENTS

| | | | |
|---|---|---|---|
| 4,823,738 A * | 4/1989 | Gold .................... | A01K 5/0114 119/51.01 |
| 6,220,479 B1 | 4/2001 | Fishman | |
| 6,267,639 B1 * | 7/2001 | Menow .................... | A63H 5/00 221/152 |
| 6,722,317 B2 | 4/2004 | O'Rourke | |
| 7,143,719 B1 * | 12/2006 | Giddens ............... | A01K 5/0114 119/51.01 |
| 7,703,447 B2 * | 4/2010 | Caveza ................ | A01K 5/0114 119/51.01 |
| 7,975,655 B2 * | 7/2011 | Piaget .................. | A01K 15/025 119/51.01 |
| 2004/0134434 A1 * | 7/2004 | Kraft .................... | A01K 15/025 119/51.01 |
| 2005/0183674 A1 | 8/2005 | Zutis | |
| 2007/0074668 A1 * | 4/2007 | Zutis .................... | A01K 5/0114 119/51.01 |
| 2012/0210940 A1 * | 8/2012 | Mahle .................. | A01K 5/0114 119/53 |

* cited by examiner

*Primary Examiner* — Trinh Nguyen
(74) *Attorney, Agent, or Firm* — Wagenknecht IP Law Group PC

(57) ABSTRACT

An apparatus for the portion wise dispensing of animal feed as reward or training aid and methods of use. An exemplary apparatus including an oblong handle, with a rear opening for inserting rod shaped animal feed, a front opening for leaving out, dispensing, or exposing the animal feed, a transport mechanism which comprises a first drive wheel and a second drive wheel which serves as a counter wheel, wherein the animal feed can be transported by rotating the first drive wheel forward as well as backward, and laterally arranged spring elements that prevent animal feed from falling from the apparatus.

8 Claims, 3 Drawing Sheets

TREAT DISPENSER AS REWARD AND TRAINING AID

CROSS REFERENCE TO RELATED APPLICATIONS

This invention claims priority to German Patent Application serial no. DE 10 2014 013 162.9 filed Sep. 4, 2014; the content of which is herein incorporated by reference in its entirety.

TECHNICAL FIELD

The invention relates to the field of dispensing animal feed. More precisely, the invention relates to an apparatus and a method for the single-handed variable dispensing of rod shaped animal feed.

BACKGROUND OF THE INVENTION

In education and training of household pets (e.g. dogs and cats) it is common to reward positive behavior in order to motivate animals to cooperate. Very often, this is done by giving so-called "treats". Most often, treat dispensing is from feed bags or pockets, where the treat is taken out of the bag or pocket by hand, and fed directly to the mouth of the animal. Depending on the animal, accepting directly from the hand can be more or less rough. Therefore, many owners risk or fear potential injury if rewarding their animal directly from the hand, and thus avoid or refuse giving treats. Further, it is often not possible to wash or to disinfect hands after providing the treat. Also, smearing of the hands during dispensing is very unhygienic and owners want to entirely avoid this.

In US 2005/0183674 A1 a dispensing aid is disclosed by means of which, using a pushbutton, individual pieces of animal feed can be dispensed out of a housing in which they are stockpiled. The feed can be dispensed in prefabricated pieces, or in sections of rod shaped products. In the latter case, the length of the sections is determined by the depth of an antechamber which is arranged between the storage chamber and a dispensing surface. Thus, the amount of dispensed feed is not variable.

BRIEF SUMMARY OF THE INVENTION

The object of the invention is to provide for dispensing of treats (rewards) directly from a person to the animal; however, dispensing is done without establishing direct contact between mouth and hand. The feed can be dispensed single-handed and in variable amounts.

The object is achieved by an apparatus for self-determined portion wise dispensing of animal feed.

The apparatus serves as reward or training aid, and has an oblong handle, a rear opening configured to receive rod shaped animal feed, a front opening configured to dispense or outwardly expose the animal feed, and a transport mechanism which includes a first drive wheel and a second drive wheel which serves as a counter wheel. The animal feed can be transported in either direction by rotating the first drive wheel, in particular forward or backward. The apparatus can also include spring elements which are arranged laterally with respect to an animal feed tunnel to prevent animal feed from falling from the tunnel when animal feed is inserted into the apparatus.

The handle can consist of two half shells which can be made from plastics or metal, and which are connected to each other by means of pins, screws, form-closing, ultrasound welding or gluing of both contours. As a matter of course, the contours of both half shells should match each other exactly.

In one embodiment, the first drive wheel of the apparatus is supported in a holder.

Error! Reference source not found. In another embodiment, the apparatus further includes laterally arranged spring elements to prevent animal feed from falling once inserted. Here, "laterally" means with respect to the tunnel in which the animal feed is inserted and travels. It is clear that the spring elements must be arranged such that they actually press against the sides of the animal feed when inserted. In a preferred embodiment, the spring elements are adjustable in order to match various diameters of the rod shaped animal feed.

In another preferred embodiment, the holder serves at the same time as spring element for clamping the animal feed between the drive wheels. Such a construction saves individual parts.

In yet another and particularly preferred embodiment, the apparatus includes a hand guard which is formed by widening the outside region of the front opening. The hand guard separates the mouth of the animal from the hand of the user when holding the oblong handle while dispensing animal feed.

Preferably, the hand guard is designed as a disk on which a truncated cone is centrically arranged at the side which faces away from the hand, having a base diameter that is smaller than the outer diameter of the disc. The shape of the truncated cone makes it almost impossible for the animal to bite into the tip of the apparatus where the feed sticks out, since its teeth will slip off due to the flat angle between cone surface and animal teeth. Preferably, the handle ends in the truncated cone, i.e. no additional section which could be bitten by the animal is present.

The invention also includes methods for dispensing animal feed using embodiments of the apparatus, including the steps of (a) loading the apparatus by manually inserting rod shaped animal feed into the rear opening and up to the drive mechanism; and (b) rotating the first drive wheel in direction of the rear opening, so that the animal feed is transported to a dispensing position.

Preferably, after step (b), the method also includes rotating the first drive wheel in direction of the front opening, so that the animal feed is transported again in direction of the rear opening, i.e. retracted into the handle in order to e.g. train the accepting behavior of the animal.

BRIEF DESCRIPTION OF THE DRAWINGS

Embodiments of the invention can be better understood with reference to the following drawings, which are part of the specification and represent preferred embodiments. Like reference numerals designate corresponding parts throughout the several views. Previously introduced numerals might be omitted in subsequent figures for brevity.

DETAILED DESCRIPTION OF PREFERRED EMBODIMENTS

Figure 1:
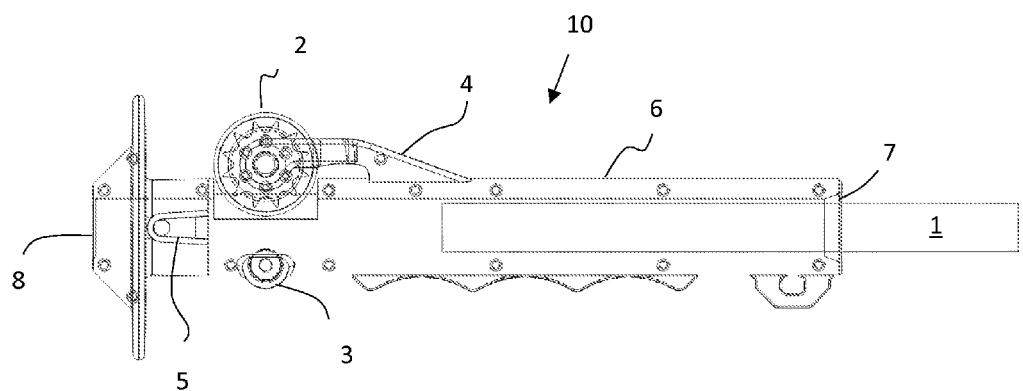
FIG. 1 is a sectional view of a preferred embodiment of the apparatus with animal feed partially inserted.

In FIG. 1, a sectional view of a preferred embodiment of the apparatus 10 (also referred to herein as a "treat dispenser 10") is depicted with animal feed 1 partially inserted. The apparatus 10 has the general shape of an oblong handle 6, optionally formed from two half shells 6A, 6B shown more clearly in FIG. 6. Turning back to FIG. 1, rod shaped animal feed 1 can be received inside the handle 6, i.e. within an inner tunnel like space which has a rear opening 7 and a front opening 8. A transport mechanism includes two wheels, a first wheel 2 (arranged on the upper side to be turned e.g. by the thumb), and a second wheel 3 which serves as a counter wheel. It is clear that in a non-depicted but also encompassed embodiment, the second wheel 3 can be omitted or replaced by a sliding surface having a similar effect or function.

The animal feed 1 which has a defined rod shape is inserted via the rear opening 7 by hand into the treat dispenser 10 up to the mechanism until its tip is located between first drive wheel 2 and second drive wheel 3.

Figure 2:
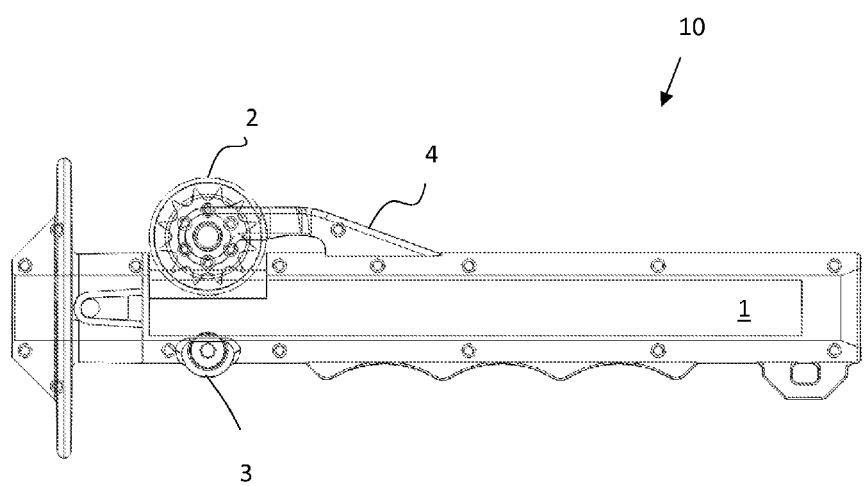
FIG. 2 is a sectional view of the embodiment with animal feed fully inserted.

As can be seen in FIG. 2, holder 4 of the first drive wheel 2 serves here as a spring element and clamps the animal feed 1 between first drive wheel 2 and second drive wheel 3.

Figure 3:
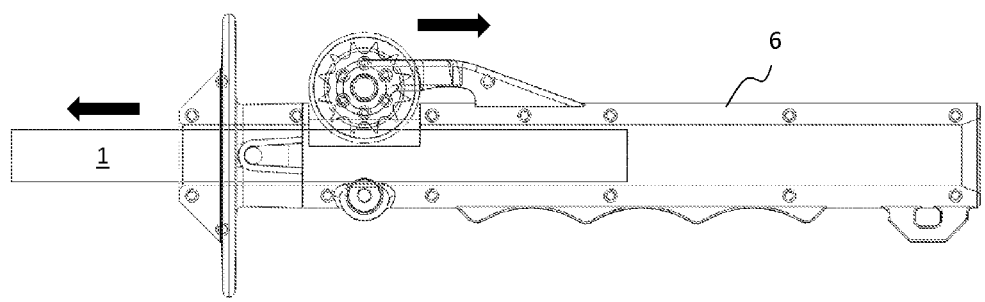
FIG. 3 is a sectional view of the embodiment with animal feed transported out of the front opening.

It is clear that as long as the rear end of the animal feed 1 sticks out of the rear opening 7 of the apparatus 10, it can be forced by hand into the handle and thus, force the transport mechanism to let the animal feed 1 slide in (i.e. by turning the drive wheels 2 and 3). However, this is not possible any more when the animal feed 1 disappears inside the handle 6, as shown in FIG. 3.

By rotating the first drive wheel 2 in direction of the rear opening 7 (right arrow), the animal feed 1 is transported forward (left arrow) in direction of the accepting position (front end of the apparatus 10, left in the figure) where it can be accepted by the animal (not shown).

The second drive wheel 3 serves as counter wheel and reduces friction during transport of the animal feed 1.

Figure 4:
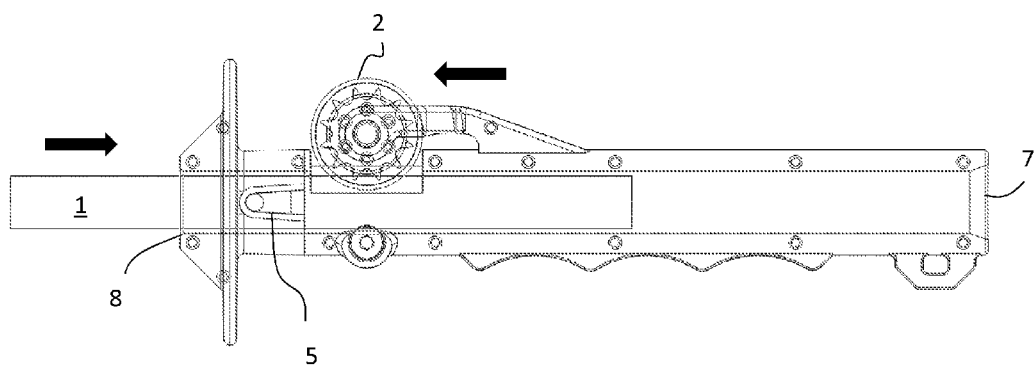
FIG. 4 is a sectional view of the embodiment with animal feed transported back into the handle.

As can be seen in FIG. 4, by rotating the first drive wheel 2 in direction of the accepting position (right arrow), the animal feed 1 can even be transported back again (left arrow, in direction of the rear opening 7), i.e. retracted. At all times, laterally arranged spring elements 5 prevent that the animal feed 1 from falling out as a leftover piece after the rest being accepted by the animal, i.e. upon completion of the transporting process.

After a complete transporting process, a new animal feed 1 can be inserted once again into the rear opening 7. During each transporting process, a piece of animal feed 1 of arbitrary length can be transported which then leaves the front opening 8 from where it can be accepted by the animal.

Figure 5:
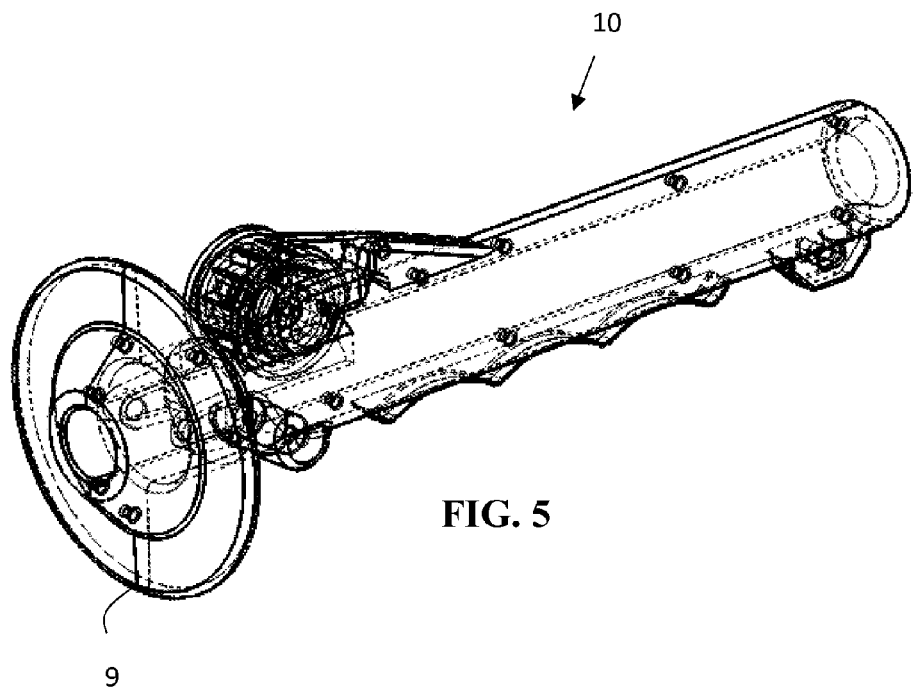
FIG. 5 is a perspective semi-transparent view of this embodiment.
Figure 6:
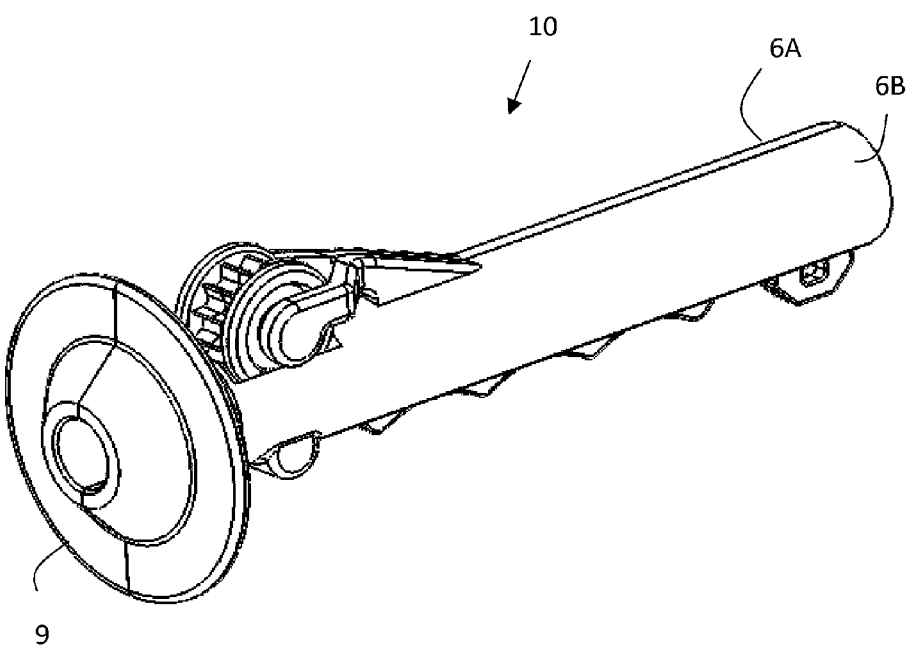
FIG. 6 is a perspective non-transparent view of this embodiment.

In FIG. 5 and FIG. 6, a perspective view of the preferred embodiment of the apparatus 10 is shown. The geometry of the accepting position which was selected by means of experiments makes it easy for the animal to accept the animal feed (not shown), and, at the same time, it protects the hand of the user from smearing with saliva or injuries. Further protection can be provided by way of a handguard 9.

By means of the treat dispenser 10, a person is able to use the animal feed in exact portions without having to let it leave the hand. The direct contact of hand to mouth is avoided.

The treat dispenser 10 can be used as training aid or as reward.

As shown, the advantages of the invention can be seen particularly in that no contact of mouth to hand is established despite direct rewarding from a person to the animal. Even animals which have not yet learned to gently accept treats can be rewarded by means of this invention without the person having to fear injuries. Due to the possibility of moving the treat forwards, in direction of the accepting position, as well as backwards, in direction of the insertion position, it is even possible to actively work on the accepting behavior of the animal. Further, by making use of the invention, no transfer of dirt or saliva takes place from the animal to the human hand any more. The reward or training can now be performed without subsequent direct washing or disinfecting of the hands.

LIST OF REFERENCES 1 animal feed
2 first drive wheel
3 second drive wheel
4 holder
5 spring element
6 handle
6A,6B half shells
7 rear opening
8 front opening
9 hand guard
10 apparatus

What is claimed is:

1. An apparatus for portion wise dispensing of animal feed as a reward or training aid, comprising an oblong handle, with a rear opening configured to receive rod shaped animal feed; a front opening configured to dispense the received animal feed; a transport mechanism which comprises a first drive wheel and a second drive wheel which serves as a counter wheel, wherein the first drive wheel and second drive wheel are positioned between the rear opening and the front opening so that rotation of the first drive wheel forward or backward transports the animal feed; and laterally arranged spring elements that prevent the animal feed from falling from the apparatus.

2. The apparatus according to claim 1, wherein the handle is composed of two half shells formed from metal or plastic, and which are connected to each other by means of pins, screws, form-closing, ultrasound welding or gluing.

3. The apparatus according to claim 1, wherein the first drive wheel is supported in a holder.

4. The apparatus according to claim 3, wherein the holder serves at the same time as spring element for clamping the animal feed between the drive wheels.

5. The apparatus according to claim 4, further comprising a hand guard which is formed by widening an outside region at least partially surrounding the front opening.

6. The apparatus according to claim 5, wherein the hand guard is formed as a disk on which a truncated cone is centrically arranged at the side which faces away from a hand, and having a base diameter that is smaller than an outer diameter of the disc.

7. A method for the portion wise dispensing of animal feed, comprising:
  (a) providing the apparatus of claim 1;
  (b) loading the apparatus by manual insertion of rod shaped animal feed via the rear opening up to the transport mechanism; and
  (c) rotating the first drive wheel in direction of the rear opening, so that the animal feed is transported to an accepting position.

8. The method according to claim 7, wherein after step (c), rotation of the first drive wheel in direction of the front opening takes place, so that the animal feed is transported again in direction of the rear opening.

\* \* \* \* \*